United States Patent
John Wilson et al.

(10) Patent No.: US 11,539,429 B2
(45) Date of Patent: Dec. 27, 2022

(54) SLOT CONFIGURATION FOR FULL DUPLEX COMMUNICATION

(71) Applicant: QUALCOMM Incorporated, San Diego, CA (US)

(72) Inventors: Makesh Pravin John Wilson, San Diego, CA (US); Tao Luo, San Diego, CA (US); Jung Ho Ryu, Fort Lee, NJ (US); Kiran Venugopal, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/736,335

(22) Filed: Jan. 7, 2020

(65) Prior Publication Data

US 2020/0228196 A1 Jul. 16, 2020

Related U.S. Application Data

(60) Provisional application No. 62/790,926, filed on Jan. 10, 2019.

(51) Int. Cl.
*H04B 7/26* (2006.01)
*H04L 5/00* (2006.01)
*H04W 72/04* (2009.01)

(52) U.S. Cl.
CPC ......... *H04B 7/2656* (2013.01); *H04L 5/0048* (2013.01); *H04W 72/042* (2013.01); *H04W 72/0446* (2013.01)

(58) Field of Classification Search
CPC ... H04B 7/2656; H04L 5/0048; H04L 5/1469; H04W 72/042; H04W 72/0446; H04W 72/1289
See application file for complete search history.

(56) References Cited

U.S. PATENT DOCUMENTS

2015/0043392 A1 2/2015 Susitaival et al.
2018/0309513 A1* 10/2018 Kim .................... H04W 72/042
2019/0053227 A1* 2/2019 Huang .............. H04L 25/03006

OTHER PUBLICATIONS

International Search Report and Written Opinion—PCT/US2020/012760—ISA/EPO—dated Apr. 3, 2020.
(Continued)

*Primary Examiner* — Dady Chery
(74) *Attorney, Agent, or Firm* — Qualcomm Incorporated

(57) ABSTRACT

Various aspects of the present disclosure generally relate to wireless communication. In some aspects, a user equipment (UE) may receive, from a base station (BS), information identifying a slot configuration indicating a slot format for each of a plurality of slots for a wireless communication link between the UE and the BS, wherein the information identifying the slot configuration includes a full duplex slot format indicator that is associated with at least one full duplex slot that is to be used for full duplex communication. The user equipment may communicate based at least in part on receiving the information identifying the slot configuration, with the BS using the at least one full duplex slot. Numerous other aspects are provided.

30 Claims, 11 Drawing Sheets

(56) References Cited

OTHER PUBLICATIONS

LG Electronics: "Discussion on Group Common PDCCH", 3GPP Draft, 3GPP TSG RAN WG1 #90bis, R1-1717953, Discussion on Group Common PDCCH Final, 3RD Generation Partnership Project (3GPP), Mobile Competence Centre, 650, Route Des Lucioles, F-06921, Sophia-Antipolis Cedex, France, vol. RAN WG1. No. Praha. Czech Republic, Oct. 9, 2017-Oct. 13, 2017, Oct. 3, 2017 (Oct. 3, 2017), XP051352834, 11 pages, Retrieved from the Internet:URL: http://www.3gpp.org/ftp/tsg_ran/WG1_RL1/TSGR1_90b/Docs/ [retrieved on Oct. 3, 2017], paragraph [0001]—paragraph [02.3].

Qualcomm Incorporated: "Contents of Group Common PDCCH", 3GPP TSG-RAN WG1#88bis, 3GPP Draft, R1-1705604, Contents of Group Common PDCCH, 3rd Generation Partnership Project (3GPP), Mobile Competence Centre, 650, Route Des Lucioles, F-06921, Sophia-Antipolis Cedex, France, vol. RAN WG1, Spokane, WA, USA, Apr. 3, 2017-Apr. 7, 2017, Mar. 25, 2017 (Mar. 25, 2017), 6 Pages, XP051252038, Retrieved from the Internet: URL: http://www.3gpp.org/ftp/tsg_ran/WG1_RL1/TSGR1_88b/Docs/ [retrieved on Mar. 25, 2017], paragraph [0002] section 3.

ZTE, et al., "Summary AI 7.7-Aspects Related to FDD", 3GPP Draft, 3GPP TSG RAN WG1 Meeting 91, R1-1721368, Summary AI 7.7-Aspects Related to FDD, 3rd Generation Partnership Project (3GPP), Mobile Competence Centre, 650, Route Des Lucioles, F-06921 Sophia-Antipolis Cedex, France, vol. RAN WG1. No. Reno, USA, Nov. 28, 2017 (Nov. 28, 2017), XP051363849, pp. 1-8, Retrieved from the Internet: URL: http://www.3gpp.org/ftp/meetings%5F3GPP%5FSYNC/RAN1/Docs/ [retrieved on Nov. 28, 2017], Fourth item of Table, p. 2, paragraph [0001]—paragraph [0002], paragraph [0004].

\* cited by examiner

SLOT CONFIGURATION FOR FULL DUPLEX COMMUNICATION

CROSS-REFERENCE TO RELATED APPLICATION

This application claims priority to U.S. Provisional Patent Application No. 62/790,926, filed on Jan. 10, 2019, entitled "SLOT CONFIGURATION FOR FULL DUPLEX COMMUNICATION," which is hereby expressly incorporated by reference herein.

FIELD OF THE DISCLOSURE

Aspects of the present disclosure generally relate to wireless communication, and more particularly to techniques and apparatuses for slot configuration for full duplex communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies remain useful. Preferably, these improvements should be applicable to other multiple access technologies and the telecommunication standards that employ these technologies.

SUMMARY

In some aspects, a method of wireless communication, performed by a user equipment (UE), may include receiving, from a base station (BS), information identifying a slot configuration indicating a slot format for each of a plurality of slots for a wireless communication link between the UE and the BS, wherein the information identifying the slot configuration includes a full duplex slot format indicator that is associated with at least one full duplex slot that is to be used for full duplex communication. The method may include communicating, based at least in part on receiving the information identifying the slot configuration, with the BS using the at least one full duplex slot.

In some aspects, a UE for wireless communication may include memory and one or more processors operatively coupled to the memory. The memory and the one or more processors may be configured to receive, from a BS, information identifying a slot configuration indicating a slot format for each of a plurality of slots for a wireless communication link between the UE and the BS, wherein the information identifying the slot configuration includes a full duplex slot format indicator that is associated with at least one full duplex slot that is to be used for full duplex communication. The memory and the one or more processors may be configured to communicate, based at least in part on receiving the information identifying the slot configuration, with the BS using the at least one full duplex slot.

In some aspects, a non-transitory computer-readable medium may store one or more instructions for wireless communication. The one or more instructions, when executed by one or more processors of a UE, may cause the one or more processors to receive, from a BS, information identifying a slot configuration indicating a slot format for each of a plurality of slots for a wireless communication link between the UE and the BS, wherein the information identifying the slot configuration includes a full duplex slot format indicator that is associated with at least one full duplex slot that is to be used for full duplex communication. The one or more instructions, when executed by one or more processors of a UE, may cause the one or more processors to communicate, based at least in part on receiving the information identifying the slot configuration, with the BS using the at least one full duplex slot.

In some aspects, an apparatus for wireless communication may include means for receiving, from a BS, information identifying a slot configuration indicating a slot format for each of a plurality of slots for a wireless communication link between the apparatus and the BS, wherein the information identifying the slot configuration includes a full duplex slot format indicator that is associated with at least one full duplex slot that is to be used for full duplex communication. The apparatus may include means for communicating, based at least in part on receiving the information identifying the slot configuration, with the BS using the at least one full duplex slot.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
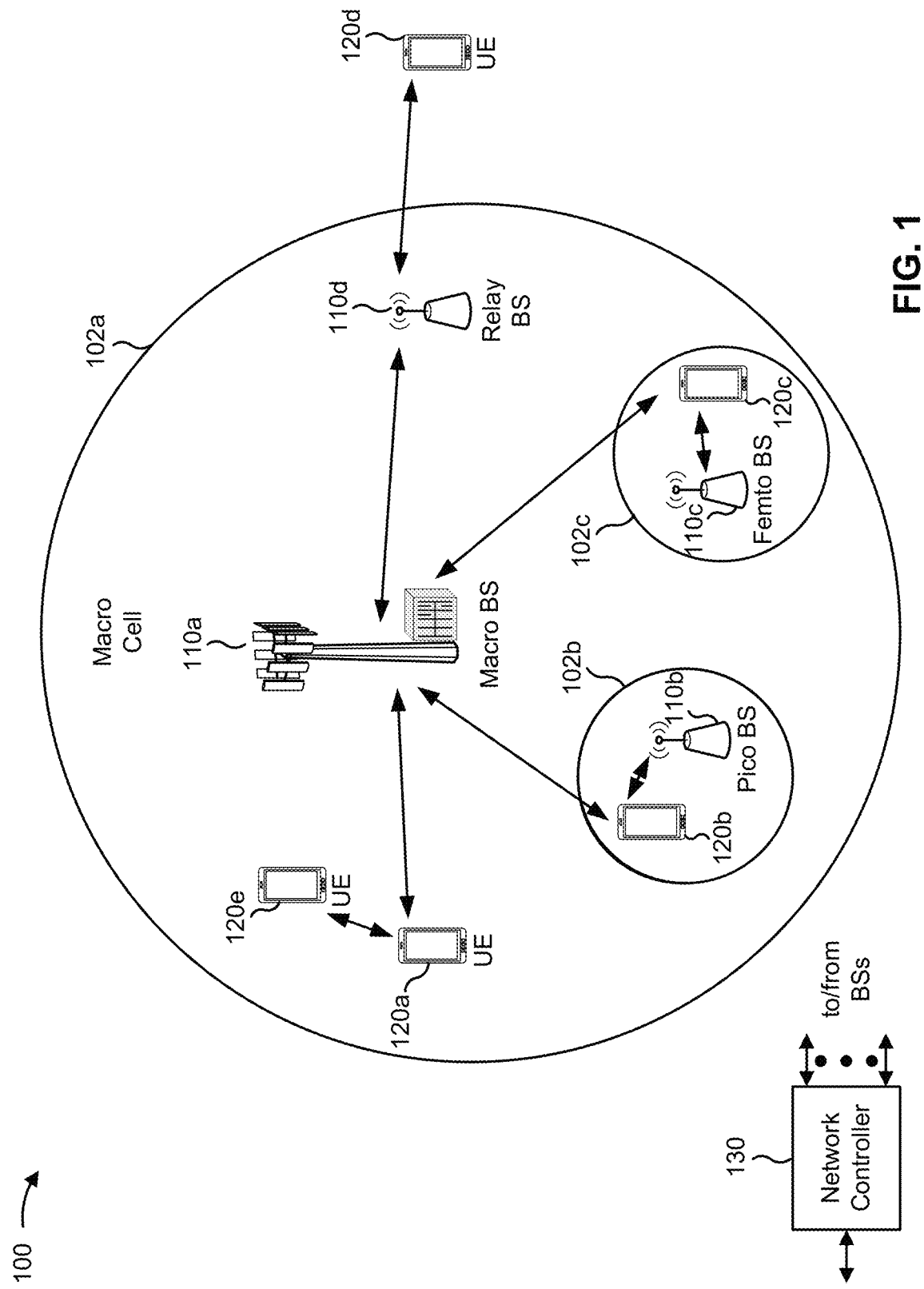
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. Wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
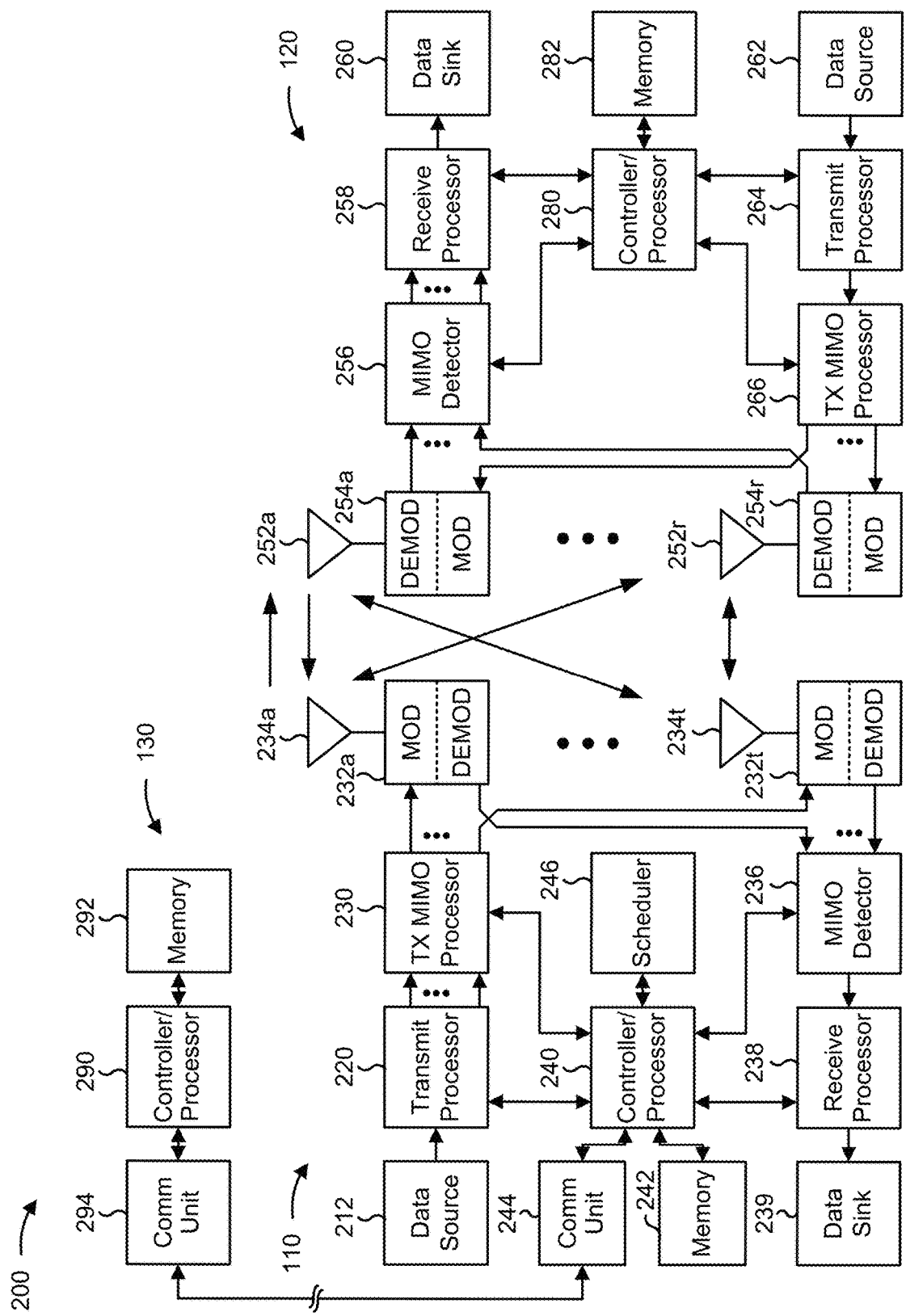
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with slot configuration for full duplex communication, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. More specifically, memory 282 may comprise one or more instructions for wireless communication that, when executed by one or more processors of UE 120, e.g., processors 280, 258, or 266, or any combination thereof, cause and/or instruct the one or more processors to perform aspects of any of example 700 and/or process 800 with reference to FIGS. 7A, 7B, 7C, and 8. Memory 282 may comprise a non-transitory computer-readable medium storing the one or more instructions, or, additionally or alternatively, memory 282 may comprise the one or more instructions which were copied onto memory 282 from a non-transitory computer-readable medium storing the one or more instructions for wireless communication. A scheduler 246 may schedule UEs for data transmission on the downlink and/or uplink.

In some aspects, UE 120 may include means for receiving, from a BS 110, information identifying a slot configuration indicating a slot format for each of a plurality of slots for a wireless communication link between UE 120 and the BS 110, wherein the information identifying the slot configuration includes a full duplex slot format indicator that is associated with at least one full duplex slot that is to be used for full duplex communication, means for communicating, based at least in part on receiving the information identifying the slot configuration, with the BS 110 using the at least one full duplex slot, and/or the like. In some aspects, such means may include one or more components of UE 120 described in connection with FIG. 2, including, for example, antennas 252, modulator/demodulators 254, MIMO detector 256, receive processor 258, controller/processor 280, memory 282, transmit processor 264, and/or TX MIMO processor 266, or any combination thereof.

As indicated above, FIG. 2 is provided merely as an example. Other examples may differ from what is described with regard to FIG. 2.

Figure 3A:
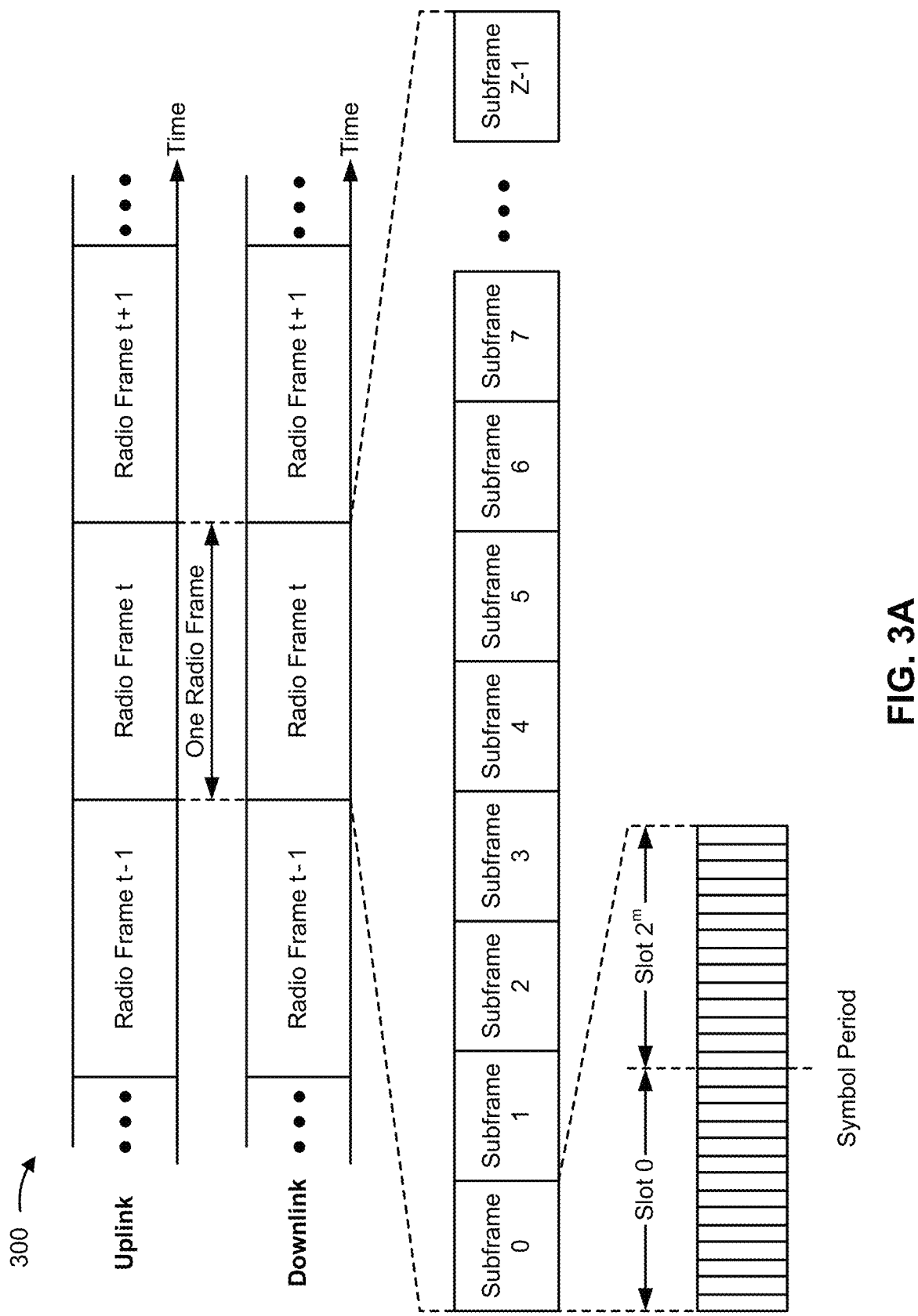
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
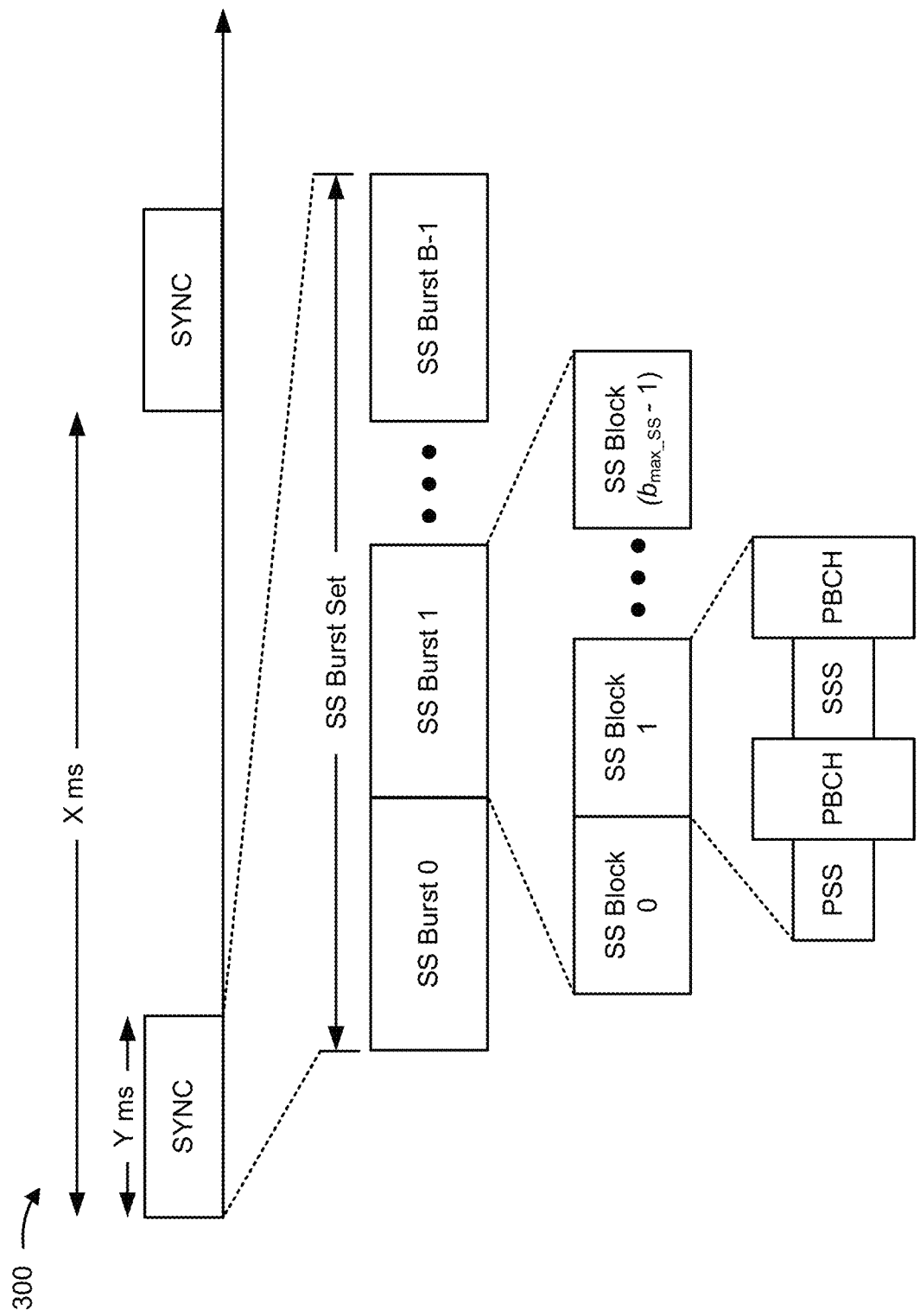
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block (bmax_SS-1), where bmax_SS-1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
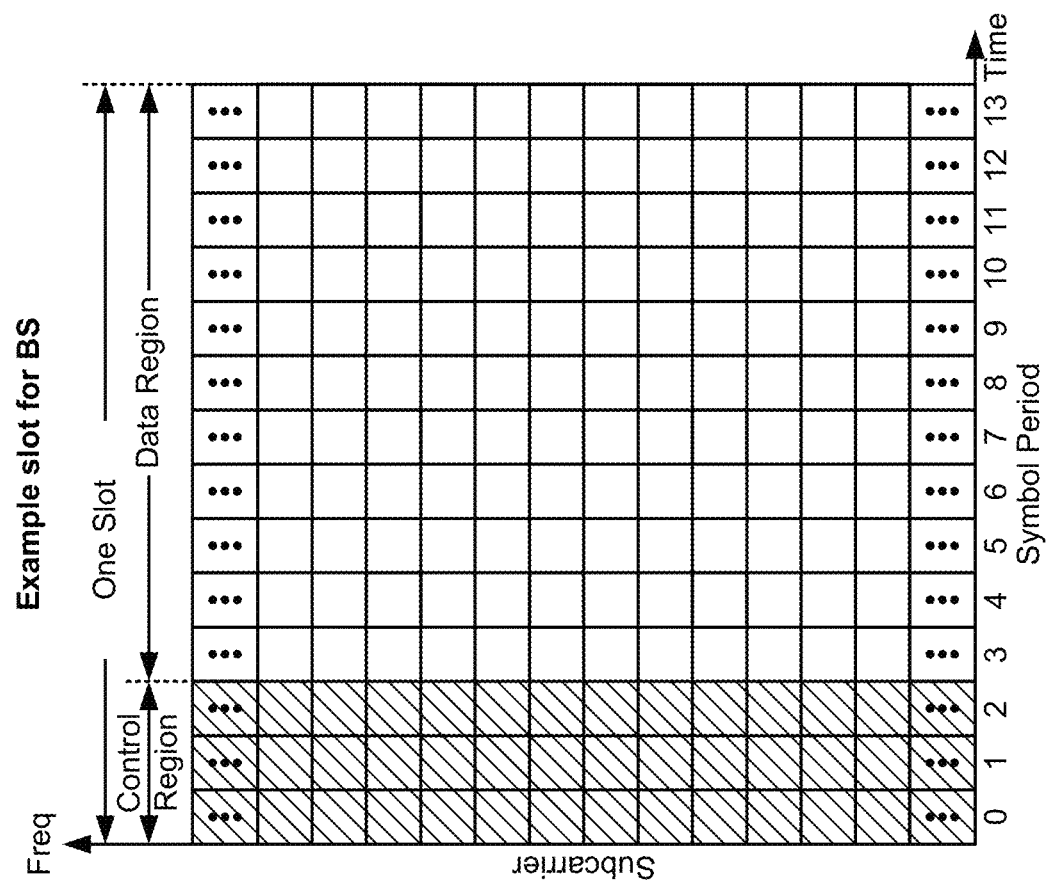
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, and/or may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, and/or may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL)

for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
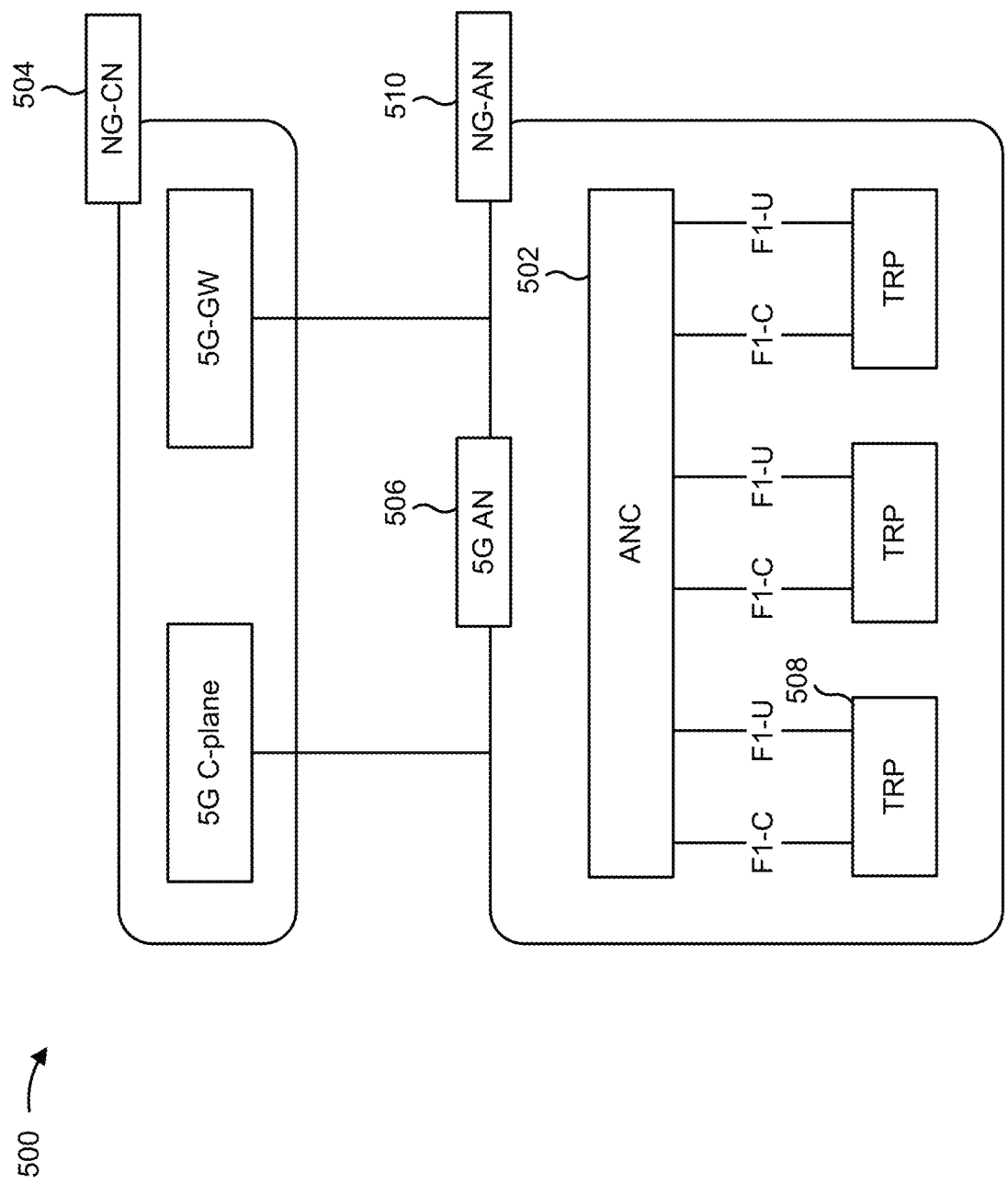
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
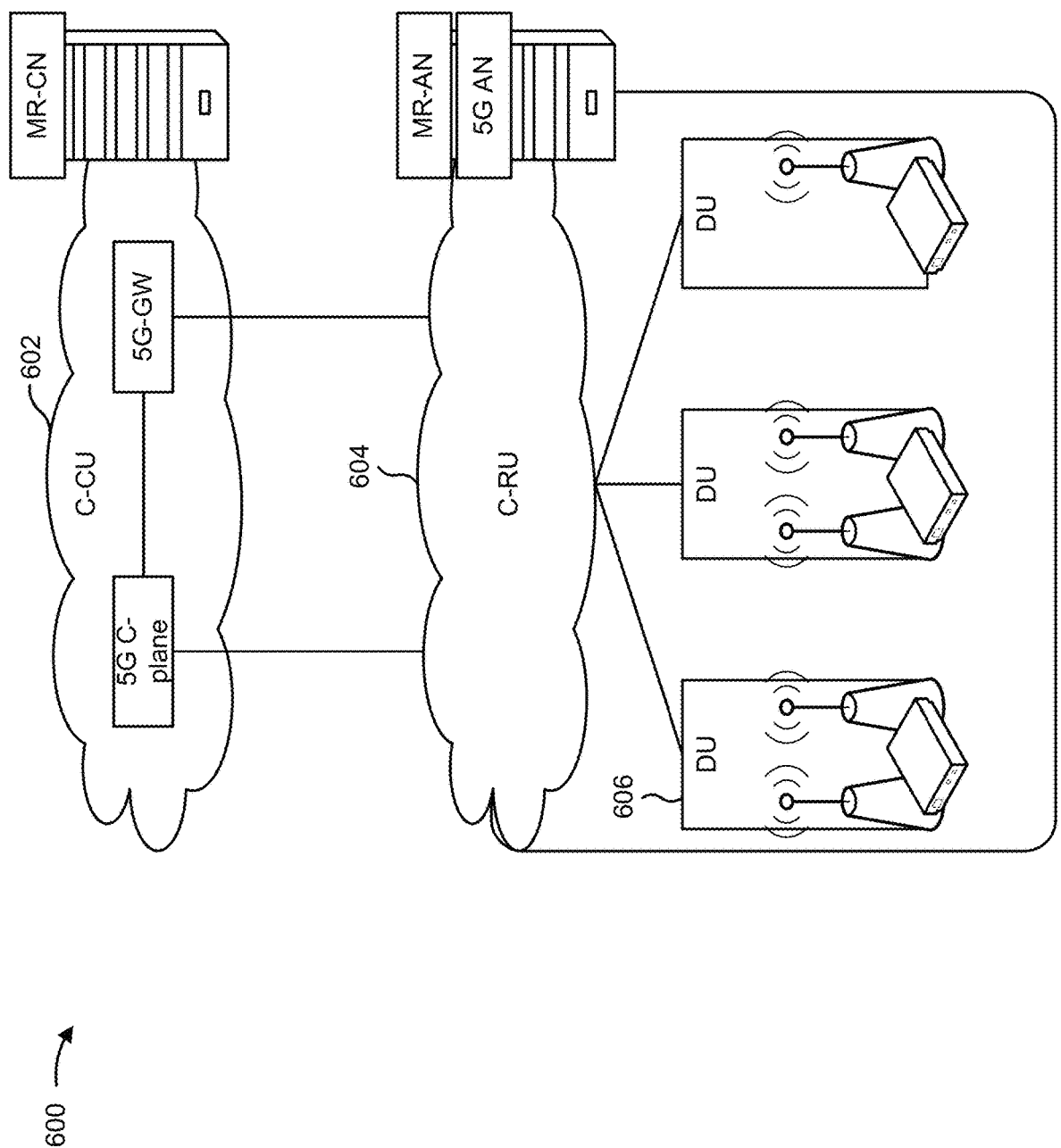
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

In a wireless network, a BS may configure a UE with a slot configuration for downlink communication, uplink communication, and/or the like. However, the BS may be unable to signal, to the UE, a slot configuration that includes one or more full duplex slots that may be used for full duplex communication. Thus, even if the UE is capable of performing full duplex communication, the BS may be unable to configure a slot configuration, for a wireless communication link between the BS and the UE, that enables the UE to utilize the UE's full duplex communication capabilities. As a result, the UE may experience decreased throughput on the wireless communication link, increased latency on the wireless communication link, and/or the like.

Some aspects described herein provide techniques and apparatuses for slot configuration for full duplex communication. In some aspects, a base station may transmit, to a user equipment, information identifying a slot configuration indicating a format for each of a plurality of slots for a wireless communication link between the UE and the BS. For example, the slot configuration may indicate, for each slot, whether the each slot is an uplink slot, a downlink slot, or a full duplex slot. In a semi-static slot configuration, the slot configuration may indicate whether the each slot is an uplink slot, a downlink slot, a full duplex slot, or a flexible slot that may be dynamically configured or defined by the BS. In such a semi-static slot configuration, the format of slots indicated as uplink, downlink, or full duplex cannot be dynamically changed, however, the format of the flexible slot may be dynamically configured or defined by the BS, using an indicator/indication transmitted to the UE in a dynamic slot indication, as an uplink slot, a downlink slot or a full duplex slot. The information identifying the slot configuration may include an indication of at least one full duplex slot, included in the slot configuration, that is to be used for full duplex communication. The UE may receive the information identifying a slot configuration and may communicate, based at least in part on receiving the information identifying the slot configuration, with the base station using the at least one full duplex slot.

In this way, the slot configuration permits the UE to simultaneously perform uplink communication and downlink communication during the at least one full duplex slot. This permits the UE to transmit and receive a greater quantity of communications during the at least one full duplex slot relative to an uplink slot or a downlink slot, which increases the throughput on the wireless communication link. Moreover, this decreases the amount of time a communication waits to be transmitted or received by the UE, which decreases latency on the wireless communication link. In addition, this increases the flexibility in scheduling communications for the UE (e.g., by introducing a new full duplex slot format, such as FDX).

Figure 7A:
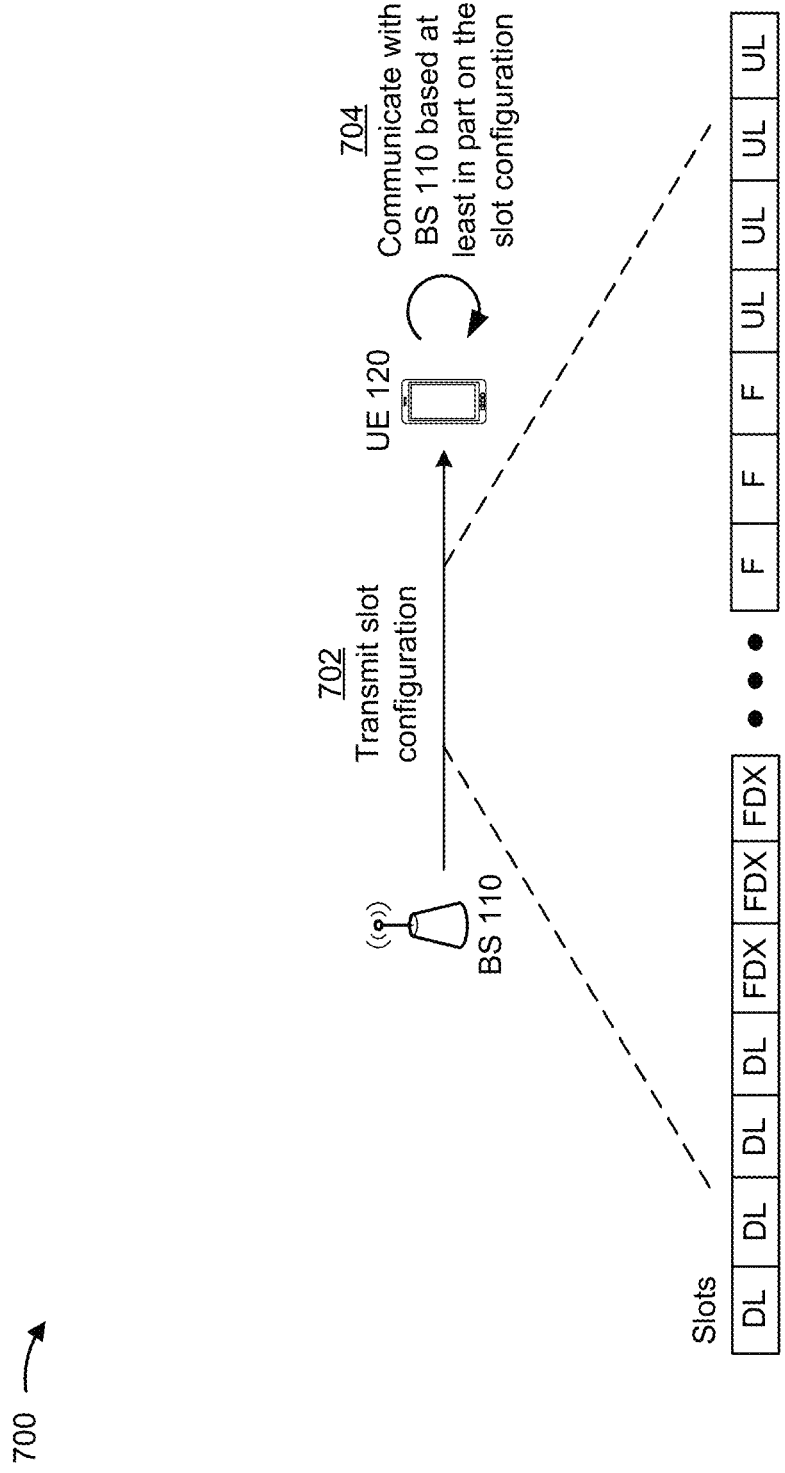
FIGS. 7A-7C are diagrams illustrating an example of slot configuration for full duplex communication, in accordance with various aspects of the present disclosure.
Figure 7B:
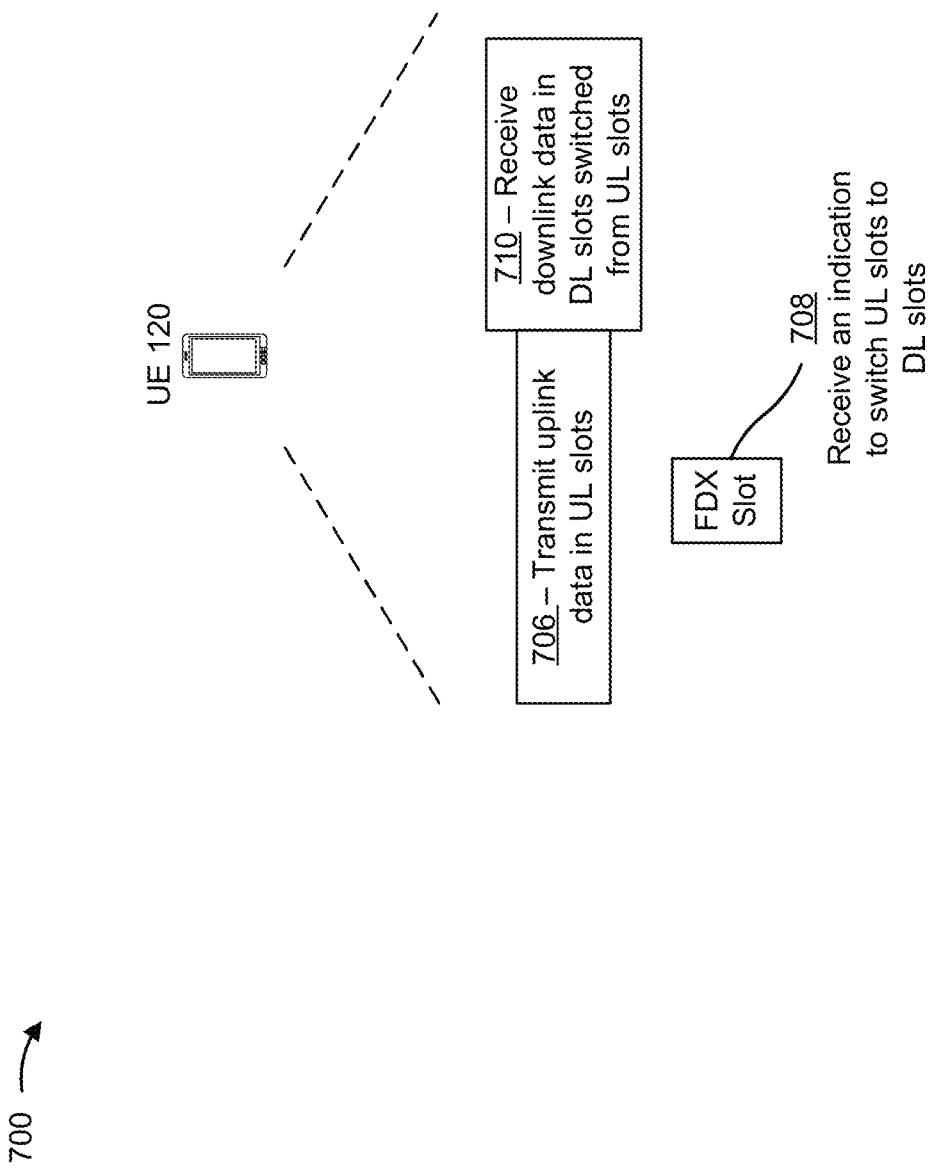
Figure 7C:
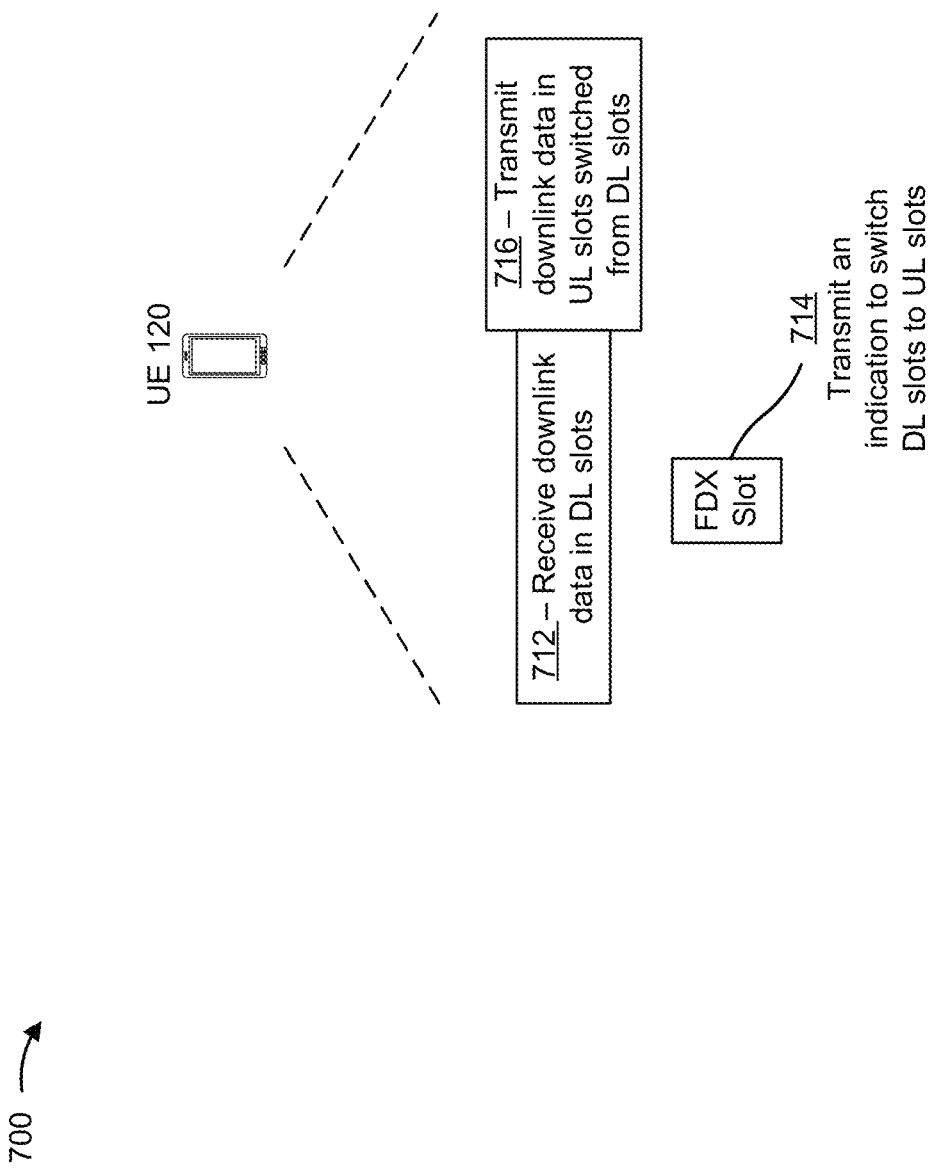

FIGS. 7A-7C are diagrams illustrating an example 700 of slot configuration for full duplex communication, in accordance with various aspects of the present disclosure. As shown in FIGS. 7A-7C, example 700 may include a base station (e.g., BS 110) and a user equipment (UE 120).

In some aspects, BS 110 and UE 120 may be included in a wireless network. BS 110 and UE 120 may be communicatively connected via a wireless communication link, which may include an uplink and a downlink. In some aspects, BS 110 may configure UE 120 with a slot configuration for communicating on the uplink, for communicating on the downlink, and/or the like.

As shown in FIG. 7A, to configure UE 120 with a slot configuration, BS 110 may transmit a signaling communication to UE 120. The signaling communication may include a radio resource control (RRC) communication, a medium access control control element (MAC-CE) communication, a downlink control information (DCI) communication, and/or the like.

The signaling communication may include information identifying the slot configuration for the wireless communication link. In some aspects, the information identifying the slot configuration may indicate a slot format for each of a plurality of slots for the wireless communication. For example, the information identifying the slot configuration may indicate a downlink (DL) slot format for one or more downlink slots and/or symbols for downlink communication, may indicate an uplink (UL) slot format for one or more uplink slots and/or symbols for uplink communication, may indicate a flexible (FLEX or F) slot format for one or more flexible slots and/or symbols that may be dynamically configured by BS 110, may indicate a full duplex (FDX) slot format for one or more full duplex slots and/or symbols for full duplex communication, and/or the like.

In some aspects, and as shown in FIG. 7A, the one or more downlink slots and/or symbols, included in the slot configuration, may be identified, in the signaling communication, via a downlink (DL) slot format indicator. The one or more uplink slots and/or symbols, included in the slot configuration, may be identified, in the signaling communication, via an uplink (UL) slot format indicator. The one or more flexible slots and/or symbols, included in the slot configuration, may be identified, in the signaling communication, via a flexible (FLEX or F) slot format indicator. The one or more full duplex slots and/or symbols, included in the slot configuration, may be identified, in the signaling communication, via a full duplex (FDX) slot format indicator.

In some aspects, the slot configuration may be indicated in a semi-static slot configuration (e.g., that is included in an RRC signaling communication). In some aspects, the slot configuration may be indicated in a dynamic slot indication (e.g., that is included in a MAC-CE or DCI communication). The dynamic slot indication may dynamically (e.g., periodically, aperiodically, semi-periodically, as needed or desired, and/or the like) configure one or more flexible slots and/or symbols that are identified in a semi-static slot configuration as being permitted to be dynamically configured by BS 110. For example, BS 110 may dynamically configure a flexible slot, included in a semi-static slot configuration, as an uplink slot, a downlink slot, or a full duplex slot.

As further shown in FIG. 7A, and by reference number 704, UE 120 may receive the signaling communication and may communicate with BS 110 based at least in part on the slot configuration identified in the signaling communication. For example, UE 120 may receive, from BS 110, one or more downlink communications during the one or more downlink slots. As another example, UE 120 may transmit, to BS 110, one or more uplink communications during the one or more uplink slots. As another example, UE 120 may transmit one or more uplink communications during the one or more full duplex slots, may receive one or more downlink communications during the one or more full duplex slots, may simultaneously transmit one or more uplink communications and receive one or more downlink communications during the one or more full duplex slots, and/or the like. In some aspects, particular uplink beams may be used on the uplink, and/or particular downlink beams may be used on the downlink, based at least in part on the isolation characteristics of the uplink beams and downlink beams, to ensure there is sufficient isolation between the uplink and the downlink for simultaneous transmission and reception by UE 120.

In some aspects, UE 120 may be unable to simultaneously transmit an uplink communication and receive a downlink communication in a full duplex slot. For example, UE 120 may be unable to simultaneously transmit an uplink communication and receive a downlink communication in the full duplex slot based at least in part on a type of uplink communication to be transmitted in the full duplex slot and/or a type of downlink communication to be received in the full duplex slot, based at least in part on a quasi-co-location (QCL) relationship between the uplink communication and the downlink communication (e.g., which may indicate one or more downlink beams that are used by BS 110 to transmit on the downlink, may include one or more uplink beams that are used by UE 120 to transmit on the uplink, and/or the like), and/or the like.

In this case, UE 120 may apply various priority rules (e.g., which may be received from BS 110, may be pre-configured for UE 120, and/or the like) for determining whether to transmit the uplink communication (e.g., and drop or refrain from receiving the downlink communication) or whether to receive the uplink communication (e.g., and drop or refrain from transmitting the downlink communication) in the full duplex slot. Table 1 illustrates various example priority rules that UE 120 may apply to a full duplex slot. Other priority rules and/or priority rules that differ from the priority rules described in Table 1 may be used.

TABLE 1

|  | PUSCH | PUCCH | UL SRS |
| --- | --- | --- | --- |
| PDSCH | Receive PDSCH | Full Duplex | Receive PDSCH |
| PDCCH | Full Duplex | Full Duplex | Full Duplex |
| DL CSI-RS | Full Duplex | Full Duplex | Full Duplex |
| DL TRS | Receive DL TRS | Receive DL TRS | Receive DL TRS |

As illustrated in Table 1, an example priority rule may include receiving a physical downlink shared channel (PDSCH) communication in the full duplex slot and dropping or refraining from transmitting a physical uplink shared channel (PUSCH) communication in the full duplex slot. Another example priority rule may include simultaneously receiving a PDSCH communication and transmitting a physical uplink control channel (PUCCH) communication in the full duplex slot. Another example priority rule may include receiving a PDSCH communication in the full duplex slot and dropping or refraining from transmitting an uplink sounding reference signal (SRS) in the full duplex slot.

Another example priority rule may include simultaneously receiving a physical uplink control channel (PUCCH) communication and transmitting a PUSCH communication in the full duplex slot. Another example priority rule may include simultaneously receiving a PUSCH communication and transmitting a PUCCH communication in the full duplex slot. Another example priority rule may include simultaneously receiving a PUSCH communication and transmitting a SRS in the full duplex slot.

Another example priority rule may include simultaneously receiving a downlink channel state information reference signal (CSI-RS) and transmitting a PUSCH communication in the full duplex slot. Another example priority rule may include simultaneously receiving a downlink CSI-RS and transmitting a PUCCH communication in the full duplex slot. Another example priority rule may include simultaneously receiving a downlink CSI-RS and transmitting a SRS in the full duplex slot.

Another example priority rule may include receiving a downlink tracking reference signal (TRS) in the full duplex slot and dropping or refraining from transmitting a PUSCH communication in the full duplex slot. Another example priority rule may include receiving a downlink TRS in the full duplex slot and dropping or refraining from transmitting a PUCCH communication in the full duplex slot. Another example priority rule may include receiving a TRS in the full duplex slot and dropping or refraining from transmitting an uplink SRS communication in the full duplex slot.

As shown in FIGS. 7B and 7C, in some aspects, UE 120 and/or BS 110 may use a full duplex slot, indicated in the slot configuration, to reconfigure and/or repurpose one or more uplink slots or one or more downlink slots indicated in the slot configuration. As shown in FIG. 7B, and by reference number 706, UE 120 may initiate the transmission of, and transmit, uplink data, to BS 110, in a plurality of uplink slots indicated in the slot configuration. As shown by reference number 708, while transmitting the uplink data, UE 120 may receive, in a full duplex slot indicated in the slot configuration, an indication from BS 110 to switch a subset of the plurality of uplink slots to downlink slots. The indication may be included in a signaling communication, such as an RRC communication, a MAC-CE communication, a DCI communication, and/or the like. As shown by reference number 710, UE 120 may switch the subset of the plurality of slots to downlink slots and receive, from BS 110, downlink data in the switched downlink slots. In this way, if BS 110 is to transmit downlink data, to UE 120, that is urgent, high priority, and/or associated with a low latency parameter, BS 110 may reduce the latency of transmitting the downlink data by instructing UE 120 to dynamically switch the subset of the plurality of uplink slots to downlink slots so that UE 120 may receive the downlink data earlier in time than if UE 120 were to wait for a downlink slot to receive the downlink data. Means for performing the functionality of any of 706, 708, and/or 710 may, but not necessarily, include, for example, antennas 252, modulator/demodulators 254, MIMO detector 256, receive processor 258, controller/processor 280, memory 282, transmit processor 264, and/or TX MIMO processor 266, or any combination thereof.

As shown in FIG. 7C, and by reference number 712, BS 110 may initiate the transmission of downlink data, to UE 120, in a plurality of downlink slots indicated in the slot configuration. As shown by reference number 714, while receiving the downlink data, UE 120 may determine to transmit uplink data to BS 110. Accordingly, UE 120 may switch a subset of the plurality of downlink slots to uplink slots and may transmit, in a full duplex slot indicated in the slot configuration, an indication to BS 110 to switch the subset of the plurality of downlink slots to uplink slots. The indication may be included in a PUSCH communication, a PUCCH communication, and/or the like. As shown by reference number 716, UE 120 may transmit, to BS 110, the uplink data in the switched uplink slots. In this way, if UE 120 is to transmit uplink data, to BS 110, that is urgent, high priority, and/or associated with a low latency parameter, UE 120 may reduce the latency of transmitting the uplink data by instructing BS 110 to dynamically switch the subset of the plurality of downlink slots to uplink slots so that UE 120 may transmit the uplink data earlier in time than if UE 120 were to wait for an uplink slot to transmit the uplink data.

In this way, BS 110 may transmit, to UE 120, a slot configuration that includes one or more full duplex slots, which permit UE 120 to simultaneously perform uplink communication and downlink communication. This permits UE 120 to transmit and receive a greater quantity of communications during the one or more full duplex slots relative to an uplink slot or a downlink slot, which increases the throughput on the wireless communication link between BS 110 and UE 120. Moreover, this decreases the amount of time a communication waits to be transmitted or received by UE 120, which decreases latency on the wireless communication link. In addition, this increases the flexibility in scheduling communications for UE 120 (e.g., by introducing a new full duplex slot format).

As indicated above, FIGS. 7A-7C are provided as an example. Other examples may differ from what is described with respect to FIGS. 7A-7C.

Figure 8:
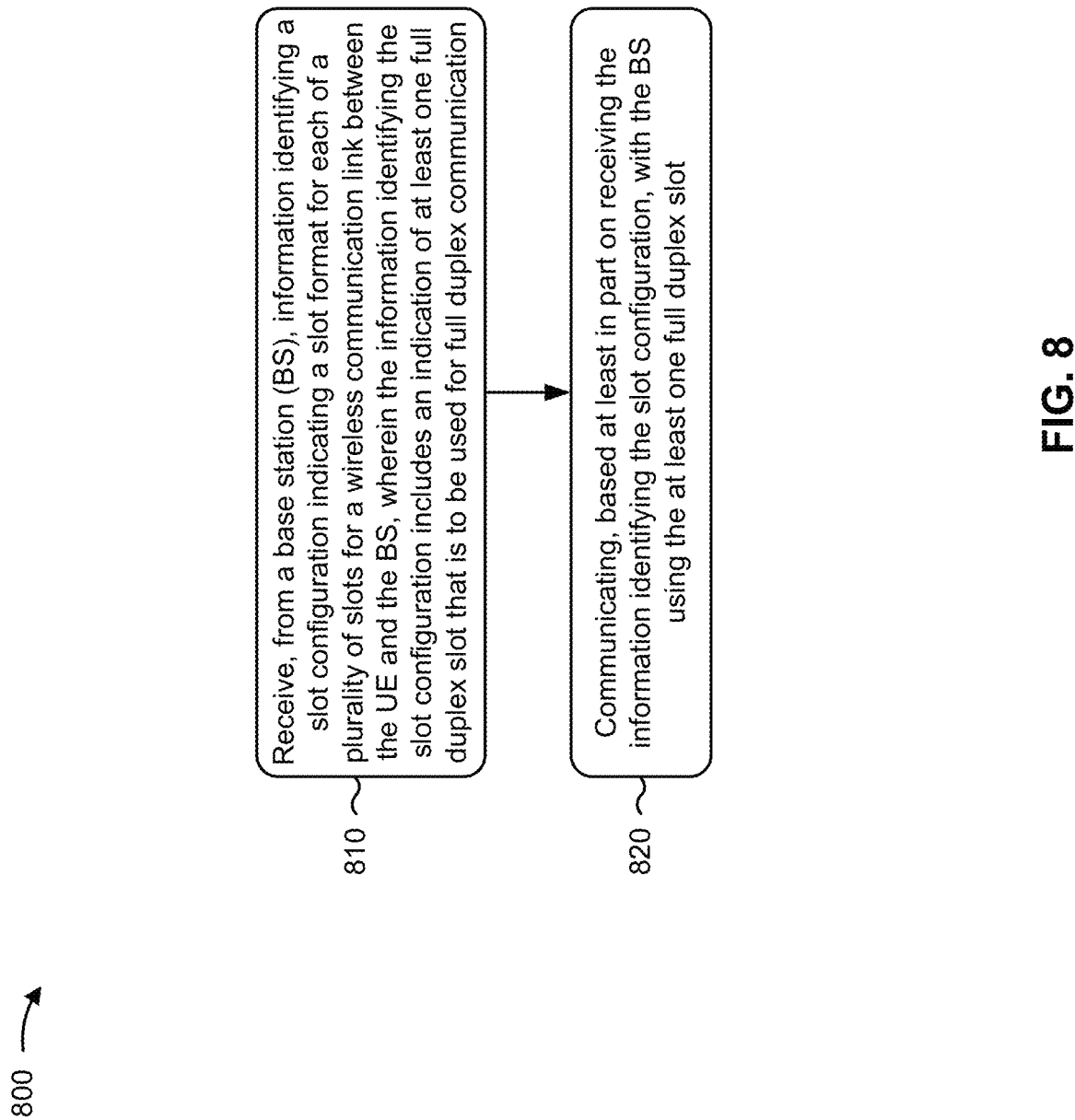
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs slot configuration for full duplex communication.

As shown in FIG. 8, process 800 may include receiving, from a BS, information identifying a slot configuration for a wireless communication link between the UE and the BS, wherein the information identifying the slot configuration includes a full duplex slot format indicator that is associated with at least one full duplex slot, included in the slot configuration, that is to be used for full duplex communication (block 810). For example, the UE (e.g., using receive processor 258, controller/processor 280, memory 282, and/or the like) may receive, from a BS, information identifying a slot configuration for a wireless communication link between the UE and the BS, as described above. In some aspects, the information identifying the slot configuration includes a full duplex slot format indicator that is associated with at least one full duplex slot, included in the slot configuration, that is to be used for full duplex communication.

As further shown in FIG. 8, process 800 may include communicating, based at least in part on receiving the information identifying the slot configuration, with the BS using the at least one full duplex slot (block 820). For example, the UE (e.g., using receive processor 258, transmit processor 264, controller/processor 280, memory 282, and/or the like) may communicate, based at least in part on receiving the information identifying the slot configuration, with the BS using the at least one full duplex slot, as described above.

Process 800 may include additional aspects, such as any single aspect or any combination of aspects described below and/or in connection with one or more other processes described elsewhere herein.

In a first aspect, the information identifying the slot configuration is included in at least one of an RRC communication, a MAC-CE communication, or a DCI communication. In a second aspect, alone or in combination with the first aspect, the information identifying the slot configuration is included in an RRC communication, and the slot configuration is indicated in a semi-static slot configuration. In a third aspect, alone or in combination with one or more of the first or second aspects, the information identifying the slot configuration is included in a DCI communication, and the slot configuration is indicated in a dynamic slot indication.

In a fourth aspect, alone or in combination with one or more of the first through third aspects, the dynamic slot indication specifies that a flexible slot, indicated in a semi-static slot configuration, is to be used as the at least one full duplex slot. In a fifth aspect, alone or in combination with one or more of the first through fourth aspects, communicating with the BS using the at least one full duplex slot comprises transmitting, to the BS, uplink data in a plurality of uplink slots identified in the slot configuration, receiving, in the at least one full duplex slot and while transmitting the uplink data, an indication from the BS to switch a subset of the uplink slots to downlink slots, switching, based at least in part on receiving the indication, the subset of the uplink slots to the downlink slots, and receiving, from the BS, downlink data in the downlink slots.

In a sixth aspect, alone or in combination with one or more of the first through fifth aspects, communicating with the BS using the at least one full duplex slot comprises receiving, from the BS, downlink data in a plurality of downlink slots identified in the slot configuration, transmitting, in the at least one full duplex slot and while receiving the downlink data, an indication to the BS to switch a subset of the downlink slots to uplink slots, switching, based at least in part on transmitting the indication, the subset of the downlink slots to the uplink slots, and transmitting, to the BS, uplink data in the uplink slots.

In a seventh aspect, alone or in combination with one or more of the first through sixth aspects, communicating with the BS using the at least one full duplex slot comprises determining whether to simultaneously receive a first communication and transmit a second communication in the at least one full duplex slot, and communicating, based at least in part on determining whether to simultaneously receive the first communication and transmit the second communication in the at least one full duplex slot, with the BS using the at least one full duplex slot.

In an eighth aspect, alone or in combination with one or more of the first through seventh aspects, determining whether to simultaneously receive the first communication and transmit the second communication in the at least one full duplex slot comprises determining whether to drop the first communication or drop the second communication based at least in part on a QCL relationship between the first communication and the second communication.

In a ninth aspect, alone or in combination with one or more of the first through eighth aspects, the first communication comprises a PDSCH communication, the second communication comprises a PUSCH communication, and determining whether to simultaneously receive the first communication and transmit the second communication in the at least one full duplex slot comprises determining not to simultaneously receive the PDSCH communication and transmit the PUSCH communication in the at least one full duplex slot, and communicating with the BS using the at least one full duplex slot comprises receiving, in the at least one full duplex slot, the PDSCH communication based at least in part on determining not to simultaneously receive the PDSCH communication and transmit the PUSCH communication in the at least one full duplex slot.

In a tenth aspect, alone or in combination with one or more of the first through ninth aspects, the first communication comprises a PDSCH communication, the second communication comprises a PUCCH communication, and determining whether to simultaneously receive the first communication and transmit the second communication in the at least one full duplex slot comprises determining to simultaneously receive the PDSCH communication and transmit the PUCCH communication in the at least one full duplex slot, and communicating with the BS using the at least one full duplex slot comprises simultaneously receiving the PDSCH communication and transmitting the PUCCH communication, in the at least one full duplex slot, based at least in part on determining to simultaneously receive the PDSCH communication and transmit the PUCCH communication in the at least one full duplex slot.

In an eleventh aspect, alone or in combination with one or more of the first through tenth aspects, the first communication comprises a PDSCH communication the second communication comprises an SRS, and determining whether to simultaneously receive the first communication and transmit the second communication in the at least one full duplex slot comprises determining not to simultaneously receive the PDSCH communication and transmit the SRS in the at least one full duplex slot, and communicating with the BS using the at least one full duplex slot comprises receiving, in the at least one full duplex slot, the PDSCH communication based at least in part on determining not to simultaneously receive the PDSCH communication and transmit the SRS in the at least one full duplex slot.

In a twelfth aspect, alone or in combination with one or more of the first through eleventh aspects, the first communication comprises a PDCCH communication, the second communication comprises a PUSCH communication, and determining whether to simultaneously receive the first communication and transmit the second communication in the at least one full duplex slot comprises determining to simultaneously receive the PDCCH communication and transmit the PUSCH communication in the at least one full duplex slot, and communicating with the BS using the at least one full duplex slot comprises simultaneously receiving the PDCCH communication and transmitting the PUSCH communication, in the at least one full duplex slot, based at least in part on determining to simultaneously receive the PDCCH communication and transmit the PUSCH communication in the at least one full duplex slot.

In a thirteenth aspect, alone or in combination with one or more of the first through twelfth aspects, the first communication comprises a PDCCH communication, the second communication comprises a PUCCH communication, and determining whether to simultaneously receive the first communication and transmit the second communication in the at least one full duplex slot comprises determining to simultaneously receive the PDCCH communication and transmit the PUCCH communication in the at least one full duplex slot, and communicating with the BS using the at least one full duplex slot comprises simultaneously receiving the PDCCH communication and transmitting the PUCCH communication, in the at least one full duplex slot, based at least in part on determining to simultaneously receive the PDCCH communication and transmit the PUCCH communication in the at least one full duplex slot.

In a fourteenth aspect, alone or in combination with one or more of the first through thirteenth aspects, the first communication comprises a PDCCH communication, the second communication comprises an SRS, and determining whether to simultaneously receive the first communication and transmit the second communication in the at least one full duplex slot comprises determining to simultaneously receive the PDCCH communication and transmit the SRS in the at least one full duplex slot, and communicating with the B S using the at least one full duplex slot comprises simultaneously receiving the PDCCH communication and transmitting the SRS, in the at least one full duplex slot, based at least in part on determining to simultaneously receive the PDCCH communication and transmit the SRS in the at least one full duplex slot.

In a fifteenth aspect, alone or in combination with one or more of the first through fourteenth aspects, the first communication comprises a CSI-RS, the second communication comprises a PUSCH communication, and determining whether to simultaneously receive the first communication and transmit the second communication in the at least one full duplex slot comprises determining to simultaneously receive the CSI-RS and transmit the PUSCH communication in the at least one full duplex slot, and communicating with the BS using the at least one full duplex slot comprises simultaneously receiving the CSI-RS and transmitting the PUSCH communication, in the at least one full duplex slot, based at least in part on determining to simultaneously receive the CSI-RS and transmit the PUSCH communication in the at least one full duplex slot.

In a sixteenth aspect, alone or in combination with one or more of the first through fifteenth aspects, the first communication comprises a CSI-RS, the second communication comprises a PUSCH communication, and determining whether to simultaneously receive the first communication and transmit the second communication in the at least one full duplex slot comprises determining to receive the CSI-RS in a first subset of symbols included in the at least one full duplex slot and determining to transmit the PUSCH communication in a second subset of symbols included in the at least one full duplex slot, and communicating with the BS using the at least one full duplex slot comprises receiving, based at least in part on determining to receive the CSI-RS in the first subset of symbols included in the at least one full duplex slot, the CSI-RS in the first subset of symbols included in the at least one full duplex slot, and transmitting, based at least in part on determining to transmit the PUSCH communication in the second subset of symbols included in the at least one full duplex slot, the PUSCH communication in the second subset of symbols included in the at least one full duplex slot.

In a seventeenth aspect, alone or in combination with one or more of the first through sixteenth aspects, the first communication comprises a CSI-RS, the second communication comprises a PUCCH communication, and determining whether to simultaneously receive the first communication and transmit the second communication in the at least one full duplex slot comprises determining to simultaneously receive the CSI-RS and transmit the PUCCH communication in the at least one full duplex slot, and communicating with the BS using the at least one full duplex slot comprises simultaneously receiving the CSI-RS and transmitting the PUCCH communication, in the at least one full duplex slot, based at least in part on determining to simultaneously receive the CSI-RS and transmit the PUCCH communication in the at least one full duplex slot.

In an eighteenth aspect, alone or in combination with one or more of the first through seventeenth aspects, the first communication comprises a CSI-RS, the second communication comprises a PUCCH communication, and determining whether to simultaneously receive the first communication and transmit the second communication in the at least one full duplex slot comprises determining not to simultaneously receive the CSI-RS and transmit the PUCCH communication in the at least one full duplex slot, and communicating with the BS using the at least one full duplex slot comprises receiving, in the at least one full duplex slot, the CSI-RS based at least in part on determining not to simultaneously receive the CSI-RS and transmit the PUCCH communication in the at least one full duplex slot.

In a nineteenth aspect, alone or in combination with one or more of the first through eighteenth aspects, the first communication comprises a CSI-RS, the second communication comprises an SRS, and determining whether to simultaneously receive the first communication and transmit the second communication in the at least one full duplex slot comprises determining to simultaneously receive the CSI-RS and transmit the SRS in the at least one full duplex slot, and communicating with the B S using the at least one full duplex slot comprises simultaneously receiving the CSI-RS and transmitting the SRS, in the at least one full duplex slot, based at least in part on determining to simultaneously receive the CSI-RS and transmit the SRS in the at least one full duplex slot.

In a twentieth aspect, alone or in combination with one or more of the first through nineteenth aspects, the first communication comprises a CSI-RS, the second communication comprises an SRS, and determining whether to simultaneously receive the first communication and transmit the second communication in the at least one full duplex slot comprises determining not to simultaneously receive the CSI-RS and transmit the SRS in the at least one full duplex slot, and communicating with the BS using the at least one full duplex slot comprises receiving, in the at least one full duplex slot, the CSI-RS based at least in part on determining not to simultaneously receive the CSI-RS and transmit the SRS in the at least one full duplex slot.

In a twenty-first aspect, alone or in combination with one or more of the first through twentieth aspects, the first communication comprises a TRS, the second communication comprises a PUSCH communication, and determining whether to simultaneously receive the first communication and transmit the second communication in the at least one full duplex slot comprises determining to receive the TRS in a first subset of symbols included in the at least one full duplex slot and determining to transmit the PUSCH communication in a second subset of symbols included in the at least one full duplex slot, and communicating with the BS using the at least one full duplex slot comprises receiving, based at least in part on determining to receive the TRS in the first subset of symbols included in the at least one full duplex slot, the TRS in the first subset of symbols included in the at least one full duplex slot and transmitting, based at least in part on determining to transmit the PUSCH communication in the second subset of symbols included in the at least one full duplex slot, the PUSCH communication in the second subset of symbols included in the at least one full duplex slot.

In a twenty-second aspect, alone or in combination with one or more of the first through twenty-first aspects, the first communication comprises a TRS, the second communication comprises a PUCCH communication, and determining whether to simultaneously receive the first communication and transmit the second communication in the at least one full duplex slot comprises determining not to simultaneously receive the TRS and transmit the PUCCH communication in the at least one full duplex slot, and communicating with the BS using the at least one full duplex slot comprises receiving, in the at least one full duplex slot, the TRS based at least in part on determining not to simultaneously receive the TRS and transmit the PUCCH communication in the at least one full duplex slot.

In a twenty-third aspect, alone or in combination with one or more of the first through twenty-second aspects, the first communication comprises a TRS, the second communication comprises an SRS, and determining whether to simultaneously receive the first communication and transmit the second communication in the at least one full duplex slot comprises determining not to simultaneously receive the TRS and transmit the SRS in the at least one full duplex slot, and communicating with the BS using the at least one full duplex slot comprises receiving, in the at least one full duplex slot, the TRS based at least in part on determining not to simultaneously receive the TRS and transmit the SRS in the at least one full duplex slot.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving, from a base station (BS), information identifying a slot configuration indicating a slot format for each of a plurality of slots for a wireless communication link between the UE and the BS,
        wherein the information identifying the slot configuration includes a full duplex slot format indicator that is associated with at least one full duplex slot that is to be used for full duplex communication; and
    communicating, based at least in part on receiving the information identifying the slot configuration, with the BS using the at least one full duplex slot.

2. The method of claim 1, wherein the information identifying the slot configuration is included in at least one of:
    a radio resource control (RRC) communication,
    a medium access control control element (MAC-CE) communication, or
    a downlink control information (DCI) communication.

3. The method of claim 1, wherein the information identifying the slot configuration is included in a radio resource control (RRC) communication; and
    wherein the slot configuration is indicated in a semi-static slot configuration.

4. The method of claim 1, wherein the information identifying the slot configuration is included in a downlink control information (DCI) communication; and
    wherein the slot configuration is indicated in a dynamic slot indication.

5. The method of claim 4, wherein the dynamic slot indication specifies that a flexible slot, indicated in a semi-static slot configuration, is to be used as the at least one full duplex slot.

6. The method of claim 1, wherein communicating with the BS using the at least one full duplex slot comprises:
    transmitting, to the BS, uplink data in a plurality of slots identified in the slot configuration, the plurality of slots including uplink slots and the at least one full duplex slot;
    receiving, in the at least one full duplex slot and while transmitting the uplink data, an indication from the BS to switch a subset of subsequent uplink slots to downlink slots;
    switching, based at least in part on receiving the indication, the subset of subsequent uplink slots to the downlink slots; and
    receiving, from the BS, downlink data in the downlink slots.

7. The method of claim 1, wherein communicating with the BS using the at least one full duplex slot comprises:
    receiving, from the BS, downlink data in a plurality of slots identified in the slot configuration, the plurality of slots including downlink slots and the at least one full duplex slot;
    transmitting, in the at least one full duplex slot and while receiving the downlink data, an indication to the BS to switch a subset of subsequent downlink slots to uplink slots;

switching, based at least in part on transmitting the indication, the subset of subsequent downlink slots to the uplink slots; and transmitting, to the BS, uplink data in the uplink slots.

8. The method of claim 1, wherein communicating with the BS using the at least one full duplex slot comprises:

determining whether to simultaneously receive a first communication and transmit a second communication in the at least one full duplex slot; and communicating, based at least in part on determining whether to simultaneously receive the first communication and transmit the second communication in the at least one full duplex slot, with the BS using the at least one full duplex slot.

9. The method of claim 8, wherein determining whether to simultaneously receive the first communication and transmit the second communication in the at least one full duplex slot comprises:

determining whether to drop the first communication or drop the second communication based at least in part on a quasi-co-location (QCL) relationship between the first communication and the second communication.

10. The method of claim 8, wherein the first communication comprises:

a physical downlink shared channel (PDSCH) communication;

wherein the second communication comprises:

a physical uplink shared channel (PUSCH) communication;

wherein determining whether to simultaneously receive the first communication and transmit the second communication in the at least one full duplex slot comprises:

determining not to simultaneously receive the PDSCH communication and transmit the PUSCH communication in the at least one full duplex slot; and wherein communicating with the BS using the at least one full duplex slot comprises:

receiving, in the at least one full duplex slot, the PDSCH communication without transmitting the PUSCH in the at least one full duplex slot based at least in part on determining not to simultaneously receive the PDSCH communication and transmit the PUSCH communication in the at least one full duplex slot.

11. The method of claim 8, wherein the first communication comprises:

a physical downlink shared channel (PDSCH) communication;

wherein the second communication comprises:

a physical uplink control channel (PUCCH) communication;

wherein determining whether to simultaneously receive the first communication and transmit the second communication in the at least one full duplex slot comprises:

determining to simultaneously receive the PDSCH communication and transmit the PUCCH communication in the at least one full duplex slot; and wherein communicating with the BS using the at least one full duplex slot comprises:

simultaneously receiving the PDSCH communication and transmitting the PUCCH communication, in the at least one full duplex slot, based at least in part on determining to simultaneously receive the PDSCH communication and transmit the PUCCH communication in the at least one full duplex slot.

12. The method of claim 8, wherein the first communication comprises:

a physical downlink shared channel (PDSCH) communication;

wherein the second communication comprises:

a sounding reference signal (SRS);

wherein determining whether to simultaneously receive the first communication and transmit the second communication in the at least one full duplex slot comprises:

determining not to simultaneously receive the PDSCH communication and transmit the SRS in the at least one full duplex slot; and wherein communicating with the BS using the at least one full duplex slot comprises:

receiving, in the at least one full duplex slot, the PDSCH communication without transmitting the SRS in the at least one full duplex slot based at least in part on determining not to simultaneously receive the PDSCH communication and transmit the SRS in the at least one full duplex slot.

13. The method of claim 8, wherein the first communication comprises:

a physical downlink control channel (PDCCH) communication;

wherein the second communication comprises:

a physical uplink shared channel (PUSCH) communication;

wherein determining whether to simultaneously receive the first communication and transmit the second communication in the at least one full duplex slot comprises:

determining to simultaneously receive the PDCCH communication and transmit the PUSCH communication in the at least one full duplex slot; and wherein communicating with the BS using the at least one full duplex slot comprises:

simultaneously receiving the PDCCH communication and transmitting the PUSCH communication, in the at least one full duplex slot, based at least in part on determining to simultaneously receive the PDCCH communication and transmit the PUSCH communication in the at least one full duplex slot.

14. The method of claim 8, wherein the first communication comprises:

a physical downlink control channel (PDCCH) communication;

wherein the second communication comprises:

a physical uplink control channel (PUCCH) communication;

wherein determining whether to simultaneously receive the first communication and transmit the second communication in the at least one full duplex slot comprises:

determining to simultaneously receive the PDCCH communication and transmit the PUCCH communication in the at least one full duplex slot; and wherein communicating with the BS using the at least one full duplex slot comprises:

simultaneously receiving the PDCCH communication and transmitting the PUCCH communication, in the at least one full duplex slot, based at least in part on determining to simultaneously receive the PDCCH communication and transmit the PUCCH communication in the at least one full duplex slot.

15. The method of claim 8, wherein the first communication comprises:

a physical downlink control channel (PDCCH) communication;
wherein the second communication comprises:
a sounding reference signal (SRS);
wherein determining whether to simultaneously receive the first communication and transmit the second communication in the at least one full duplex slot comprises:
determining to simultaneously receive the PDCCH communication and transmit the SRS in the at least one full duplex slot; and
wherein communicating with the BS using the at least one full duplex slot comprises:
simultaneously receiving the PDCCH communication and transmitting the SRS, in the at least one full duplex slot, based at least in part on determining to simultaneously receive the PDCCH communication and transmit the SRS in the at least one full duplex slot.

16. The method of claim 8, wherein the first communication comprises:
a channel state information reference signal (CSI-RS);
wherein the second communication comprises:
a physical uplink shared channel (PUSCH) communication;
wherein determining whether to simultaneously receive the first communication and transmit the second communication in the at least one full duplex slot comprises:
determining to simultaneously receive the CSI-RS and transmit the PUSCH communication in the at least one full duplex slot; and
wherein communicating with the BS using the at least one full duplex slot comprises:
simultaneously receiving the CSI-RS and transmitting the PUSCH communication, in the at least one full duplex slot, based at least in part on determining to simultaneously receive the CSI-RS and transmit the PUSCH communication in the at least one full duplex slot.

17. The method of claim 8, wherein the first communication comprises:
a channel state information reference signal (CSI-RS);
wherein the second communication comprises:
a physical uplink shared channel (PUSCH) communication;
wherein determining whether to simultaneously receive the first communication and transmit the second communication in the at least one full duplex slot comprises:
determining to receive the CSI-RS in a first subset of symbols included in the at least one full duplex slot, and
determining to transmit the PUSCH communication in a second subset of symbols included in the at least one full duplex slot; and
wherein communicating with the BS using the at least one full duplex slot comprises:
receiving, based at least in part on determining to receive the CSI-RS in the first subset of symbols included in the at least one full duplex slot, the CSI-RS in the first subset of symbols included in the at least one full duplex slot, and
transmitting, based at least in part on determining to transmit the PUSCH communication in the second subset of symbols included in the at least one full duplex slot, the PUSCH communication in the second subset of symbols included in the at least one full duplex slot.

18. The method of claim 8, wherein the first communication comprises:
a channel state information reference signal (CSI-RS);
wherein the second communication comprises:
a physical uplink control channel (PUCCH) communication;
wherein determining whether to simultaneously receive the first communication and transmit the second communication in the at least one full duplex slot comprises:
determining to simultaneously receive the CSI-RS and transmit the PUCCH communication in the at least one full duplex slot; and
wherein communicating with the BS using the at least one full duplex slot comprises:
simultaneously receiving the CSI-RS and transmitting the PUCCH communication, in the at least one full duplex slot, based at least in part on determining to simultaneously receive the CSI-RS and transmit the PUCCH communication in the at least one full duplex slot.

19. The method of claim 8, wherein the first communication comprises:
a channel state information reference signal (CSI-RS);
wherein the second communication comprises:
a physical uplink control channel (PUCCH) communication;
wherein determining whether to simultaneously receive the first communication and transmit the second communication in the at least one full duplex slot comprises:
determining not to simultaneously receive the CSI-RS and transmit the PUCCH communication in the at least one full duplex slot; and
wherein communicating with the BS using the at least one full duplex slot comprises:
receiving, in the at least one full duplex slot, the CSI-RS without transmitting the PUCCH in the at least one full duplex slot based at least in part on determining not to simultaneously receive the CSI-RS and transmit the PUCCH communication in the at least one full duplex slot.

20. The method of claim 8, wherein the first communication comprises:
a channel state information reference signal (CSI-RS);
wherein the second communication comprises:
a sounding reference signal (SRS);
wherein determining whether to simultaneously receive the first communication and transmit the second communication in the at least one full duplex slot comprises:
determining to simultaneously receive the CSI-RS and transmit the SRS in the at least one full duplex slot; and
wherein communicating with the BS using the at least one full duplex slot comprises:
simultaneously receiving the CSI-RS and transmitting the SRS, in the at least one full duplex slot, based at least in part on determining to simultaneously receive the CSI-RS and transmit the SRS in the at least one full duplex slot.

21. The method of claim 8, wherein the first communication comprises:
a channel state information reference signal (CSI-RS);

wherein the second communication comprises:
a sounding reference signal (SRS);
wherein determining whether to simultaneously receive the first communication and transmit the second communication in the at least one full duplex slot comprises:
determining not to simultaneously receive the CSI-RS and transmit the SRS in the at least one full duplex slot; and
wherein communicating with the BS using the at least one full duplex slot comprises:
receiving, in the at least one full duplex slot, the CSI-RS without transmitting the SRS in the at least one full duplex slot based at least in part on determining not to simultaneously receive the CSI-RS and transmit the SRS in the at least one full duplex slot.

22. The method of claim 8, wherein the first communication comprises:
a tracking reference signal (TRS);
wherein the second communication comprises:
a physical uplink shared channel (PUSCH) communication;
wherein determining whether to simultaneously receive the first communication and transmit the second communication in the at least one full duplex slot comprises:
determining to receive the TRS in a first subset of symbols included in the at least one full duplex slot, and
determining to transmit the PUSCH communication in a second subset of symbols included in the at least one full duplex slot; and
wherein communicating with the BS using the at least one full duplex slot comprises:
receiving, based at least in part on determining to receive the TRS in the first subset of symbols included in the at least one full duplex slot, the TRS in the first subset of symbols included in the at least one full duplex slot, and
transmitting, based at least in part on determining to transmit the PUSCH communication in the second subset of symbols included in the at least one full duplex slot, the PUSCH communication in the second subset of symbols included in the at least one full duplex slot.

23. The method of claim 8, wherein the first communication comprises:
a tracking reference signal (TRS);
wherein the second communication comprises:
a physical uplink control channel (PUCCH) communication;
wherein determining whether to simultaneously receive the first communication and transmit the second communication in the at least one full duplex slot comprises:
determining not to simultaneously receive the TRS and transmit the PUCCH communication in the at least one full duplex slot; and
wherein communicating with the BS using the at least one full duplex slot comprises:
receiving, in the at least one full duplex slot, the TRS without transmitting the PUCCH in the at least one full duplex slot based at least in part on determining not to simultaneously receive the TRS and transmit the PUCCH communication in the at least one full duplex slot.

24. The method of claim 8, wherein the first communication comprises:
a tracking reference signal (TRS);
wherein the second communication comprises:
a sounding reference signal (SRS);
wherein determining whether to simultaneously receive the first communication and transmit the second communication in the at least one full duplex slot comprises:
determining not to simultaneously receive the TRS and transmit the SRS in the at least one full duplex slot; and
wherein communicating with the BS using the at least one full duplex slot comprises:
receiving, in the at least one full duplex slot, the TRS without transmitting the SRS in the at least one full duplex slot based at least in part on determining not to simultaneously receive the TRS and transmit the SRS in the at least one full duplex slot.

25. A user equipment (UE) for wireless communication, comprising:
a memory; and
one or more processors operatively coupled to the memory, the memory and the one or more processors configured to:
receive, from a base station (BS), information identifying a slot configuration indicating a slot format for each of a plurality of slots for a wireless communication link between the UE and the BS,
wherein the information identifying the slot configuration includes a full duplex slot format indicator that is associated with at least one full duplex slot that is to be used for full duplex communication; and
communicate, based at least in part on receiving the information identifying the slot configuration, with the BS using the at least one full duplex slot.

26. The UE of claim 25, wherein the one or more processors, when communicating with the BS using the at least one full duplex slot, are configured to:
transmit, to the BS, uplink data in a plurality of slots identified in the slot configuration, the plurality of slots including uplink slots and the at least one full duplex slot;
receive, in the at least one full duplex slot and while transmitting the uplink data, an indication from the BS to switch a subset of subsequent uplink slots to downlink slots;
switch, based at least in part on receiving the indication, the subset of subsequent uplink slots to the downlink slots; and
receive, from the BS, downlink data in the downlink slots.

27. A non-transitory computer-readable medium storing one or more instructions for wireless communication, the one or more instructions comprising:
one or more instructions that, when executed by one or more processors of a user equipment (UE), cause the one or more processors to:
receive, from a base station (BS), information identifying a slot configuration indicating a slot format for each of a plurality of slots for a wireless communication link between the UE and the BS,
wherein the information identifying the slot configuration includes a full duplex slot format indicator that is associated with at least one full duplex slot that is to be used for full duplex communication; and communicate, based at least in part on receiving the information identifying the slot configuration, with the BS using the at least one full duplex slot.

28. The non-transitory computer-readable medium of claim 27, wherein the one or more instructions, that cause the one or more processors to communicate with the BS using the at least one full duplex slot, cause the one or more processors to:
- transmit, to the BS, uplink data in a plurality of slots identified in the slot configuration, the plurality of slots including uplink slots and the at least one full duplex slot;
- receive, in the at least one full duplex slot and while transmitting the uplink data, an indication from the BS to switch a subset of subsequent uplink slots to downlink slots;
- switch, based at least in part on receiving the indication, the subset of subsequent uplink slots to the downlink slots; and
- receive, from the BS, downlink data in the downlink slots.

29. An apparatus for wireless communication, comprising:
- means for receiving, from a base station (BS), information identifying a slot configuration indicating a slot format for each of a plurality of slots for a wireless communication link between the apparatus and the BS, wherein the information identifying the slot configuration includes a full duplex slot format indicator that is associated with at least one full duplex slot that is to be used for full duplex communication; and
- means for communicating, based at least in part on receiving the information identifying the slot configuration, with the BS using the at least one full duplex slot.

30. The apparatus of claim 29, wherein the means for communicating with the BS using the at least one full duplex slot comprises:
- means for transmitting, to the BS, uplink data in a plurality of slots identified in the slot configuration, the plurality of slots including uplink slots and the at least one full duplex slot;
- means for receiving, in the at least one full duplex slot and while transmitting the uplink data, an indication from the BS to switch a subset of subsequent uplink slots to downlink slots;
- means for switching, based at least in part on receiving the indication, the subset of subsequent uplink slots to the downlink slots; and
- means for receiving, from the BS, downlink data in the downlink slots.

* * * * *